US012336059B2

(12) United States Patent
Han et al.

(10) Patent No.: US 12,336,059 B2
(45) Date of Patent: Jun. 17, 2025

(54) HEATING SYSTEM AND ELECTRONIC DEVICE HAVING THE SAME

(71) Applicant: VANAM INC., Seoul (KR)

(72) Inventors: Soo Deok Han, Seoul (KR); Won Young Choi, Seoul (KR)

(73) Assignee: VANAM INC., Seoul (KR)

( * ) Notice: Subject to any disclaimer, the term of this patent is extended or adjusted under 35 U.S.C. 154(b) by 0 days.

(21) Appl. No.: 18/951,801

(22) Filed: Nov. 19, 2024

(65) Prior Publication Data

US 2025/0168928 A1 May 22, 2025

(30) Foreign Application Priority Data

Nov. 20, 2023 (KR) ........................ 10-2023-0160959

(51) Int. Cl.

*H05B 1/02* (2006.01)
*H05B 3/00* (2006.01)
*H05B 3/16* (2006.01)

(52) U.S. Cl.

CPC ......... *H05B 1/0202* (2013.01); *H05B 3/0014* (2013.01); *H05B 3/0019* (2013.01); *H05B 3/16* (2013.01); *H05B 2203/03* (2013.01)

(58) Field of Classification Search

CPC .. H05B 1/0202; H05B 3/0014; H05B 3/0019; H05B 3/16; H05B 2203/03

See application file for complete search history.

(56) References Cited

U.S. PATENT DOCUMENTS 10,285,218 B1 * 5/2019 Gaitas .................. H05B 3/0014
2013/0105464 A1 * 5/2013 Yue .......................... H05B 3/20 219/483
2013/0187113 A1 * 7/2013 Martens ................. H10N 70/20 257/2
2013/0187680 A1 * 7/2013 Martens ................. H03K 19/20 326/104
2013/0207069 A1 * 8/2013 Pickett ................... H10N 80/01 257/8
2014/0318560 A1 * 10/2014 Hon ...................... H02J 7/0045 131/329
2024/0234037 A1 7/2024 Han

FOREIGN PATENT DOCUMENTS

KR 10-2018-0093754 8/2018
KR 20180093754 A * 8/2018
KR 10-2021-0047051 4/2021
KR 20210047051 A * 4/2021
KR 10-2502699 8/2023

OTHER PUBLICATIONS

KR20180093754A Translation (Year: 2025).*
KR20210047051A Translation (Year: 2025).*

* cited by examiner

*Primary Examiner* — Elizabeth M Kerr
*Assistant Examiner* — Keith Brian Assante
(74) *Attorney, Agent, or Firm* — PnK IP LLC

(57) ABSTRACT

A heating system of the present disclosure includes: a heating element configured to generate heat; a thermoelectric device disposed adjacent to the heating element; and a switching device electrically connected to the thermoelectric device and configured to maintain a temperature of the heating element within a set temperature range by switching current that is supplied to the thermoelectric device based on the temperature of the heating element.

13 Claims, 9 Drawing Sheets

HEATING SYSTEM AND ELECTRONIC DEVICE HAVING THE SAME

CROSS REFERENCE TO RELATED APPLICATIONS

This application claims priority from and the benefit of Korean Patent Application No. 10-2023-0160959, filed on Nov. 20, 2023, which is hereby incorporated by reference for all purposes as if fully set forth herein.

BACKGROUND

Field

Embodiments of the invention relate generally to a heating system, and more specifically, to a heating system and electronic device having the same.

Discussion of the Background

In general, an electronic device including a heating system may increase the temperature by using a heating element such as a heating wire in the heating system, and may control the temperature by using a temperature control device. For example, the temperature of the electronic device may be controlled using a control device such as a proportional-integral-differential controller (PID controller).

Meanwhile, as rechargeable battery technology becomes more advanced, the development of a small electronic device is increasing. Such a small electronic device requires only an on/off control such as maintenance or cutoff of current that is supplied to a heating element, but the above-described proportional-integral-differential controller provides functionality beyond the on/off control, which causes the price of the small electronic device to increase.

Accordingly, it is necessary to develop a switching device capable of providing maintenance or cutoff function of a current in a cheap and simple way.

Further, in the event that the small electronic device is overheated by a heating device, a separate cooling device capable of performing rapid cooling is required.

The above information disclosed in this Background section is only for understanding of the background of the inventive concepts, and, therefore, it may contain information that does not constitute prior art.

SUMMARY

An object of the present disclosure is to provide a heating system capable of quickly cutting off current that is supplied to a heating device at a specific temperature while simultaneously cooling the heating device, and an electronic device including the heating system.

Additional features of the inventive concepts will be set forth in the description which follows, and in part will be apparent from the description, or may be learned by practice of the inventive concepts.

In one aspect of the present disclosure, a heating system may include: a heating element configured to generate heat; a thermoelectric device disposed adjacent to the heating element; and a switching device electrically connected to the thermoelectric device and configured to maintain a temperature of the heating element within a set temperature range by switching current that is supplied to the thermoelectric device based on the temperature of the heating element.

In an embodiment of the present disclosure, the switching device may have a metal-insulator transition (MIT).

In an embodiment of the present disclosure, the switching device may be configured to switch the current by a metal-insulator transition of a functional thin film including vanadium dioxide ($VO_2$).

In an embodiment of the present disclosure, a phase transition temperature of the switching device may be lower than the set temperature.

In an embodiment of the present disclosure, the heating system may further include a thermal buffer disposed between the heating element and the switching device, wherein the thermal buffer may be configured to enable the phase transition to occur at a temperature that is lower than the set temperature by buffering heat that is transferred from the heating element to the switching device in the middle.

In an embodiment of the present disclosure, the heating system may further include a thermal buffer disposed between the heating element and the switching device, wherein the thermal buffer may be configured to enable the heating element to be maintained within a range of the set temperature that is higher than the phase transition temperature by buffering heat that is transferred from the heating element to the switching device in the middle.

In an embodiment of the present disclosure, the heating element and the thermoelectric device may be connected in parallel, and the switching device may be connected to the heating element in parallel and may be connected to the thermoelectric device in series.

In an embodiment of the present disclosure, the heating system may further include a power supply part that supplies current to the heating element and the thermoelectric device, wherein the current of the power supply part may be applied to the heating element at a temperature that is equal to or lower than a phase transition temperature $T_{MI}$ at which the metal-insulator transition of the switching device occurs, and the current of the power supply part may be applied to the thermoelectric device to cool the heating element in a temperature range that exceeds the phase transition temperature $T_{MI}$.

In an embodiment of the present disclosure, the heating system may further include a resistor disposed between the power supply part and the heating element and connected in series to the power supply part.

In an embodiment of the present disclosure, a resistance value of the resistor may be between a resistance value of the switching device at the temperature that is equal to or lower than the phase transition temperature $T_{MI}$ and a resistance value of the switching device in the temperature range that exceeds the phase transition temperature $T_{MI}$.

In an embodiment of the present disclosure, the switching device may include: an $Al_2O_3$ single crystal base substrate; a $VO_2$ functional thin film disposed on the base substrate and doped with Ti; and first and second external electrodes disposed to be spaced apart from each other on the base substrate and/or the functional thin film and connected to the functional thin film.

In one aspect of the present disclosure, an electronic device may include: a heating system configured to generate heat through being provided with a power; a body part configured to provide a space in which the heating system is installed; and a power supply part coupled to a part of the body part and configured to supply the power to the heating system, wherein the heating system may include: a heating element configured to generate the heat; a thermoelectric device disposed adjacent to the heating element; and a switching device electrically connected to the thermoelectric device and configured to maintain a temperature of the heating element within a set temperature range by switching current that is supplied to the thermoelectric device based on the temperature of the heating element.

The heating system and the electronic device including the same according to the present disclosure may quickly cut off the current that is supplied to the heating device at the specific temperature, and may cool the heating device at the same time.

It is to be understood that both the foregoing general description and the following detailed description are illustrative and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
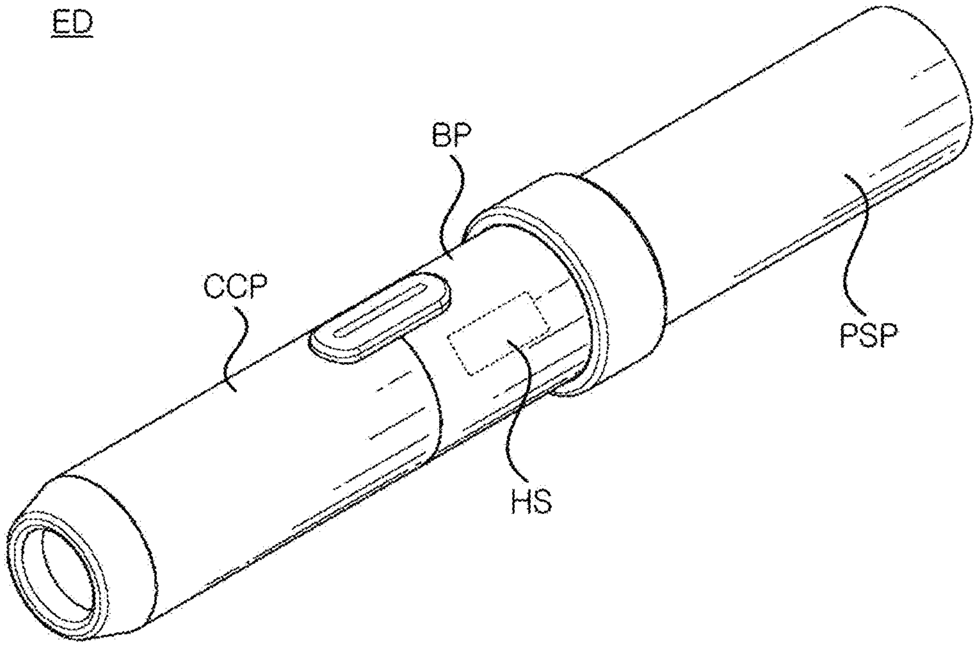
FIG. 1 is a view illustrating a small electronic device according to an embodiment of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a thin film substrate and an energy-sensitive electronic component according to an embodiment of the present disclosure will be described in detail with reference to the accompanying drawings. In describing the present disclosure with reference to the accompanying drawings, the same reference numerals are used for the same or corresponding constituent elements, and the duplicate explanation thereof will be omitted.

Various types of electronic components are used in an electronic device, and for the purpose of preventing overheating or overvoltage, various types of energy-sensitive electronic components may be appropriately used among such electronic components. The energy-sensitive electronic component may be, for example, a thermistor that is a heat energy-sensitive electronic component or a varistor that is an electrical energy-sensitive electronic component, and may be used to protect various types of electronic devices, and various types of electronic components and various types of electronic component modules of the electronic device.

In the present specification, the energy-sensitive electronic component may mean an electronic component of which the electrical resistance is changed according to changes of energy, such as heat energy, electrical energy, or light energy. However, hereinafter, for the sake of simplicity, the following discussion will assume that the electrical resistance of the energy-sensitive electronic component changes according to the change of the heat energy, that is, according to the temperature change.

Hereinafter, preferred embodiments of the present disclosure will be described in detail with reference to the accompanying drawings.

Figure 2:
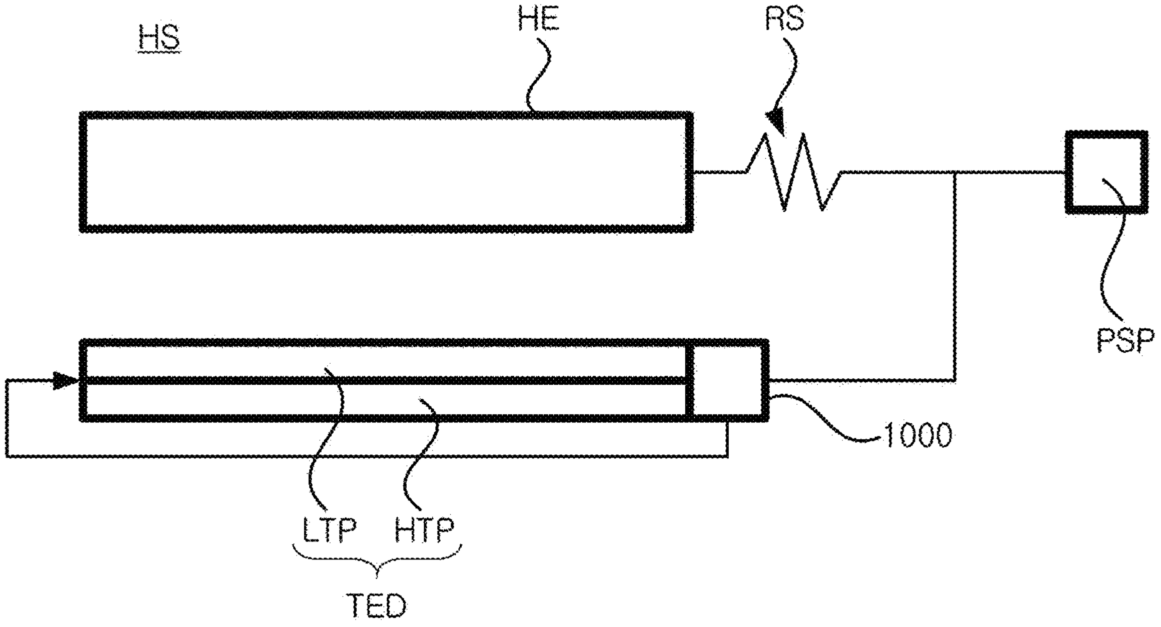
FIG. 2 is a diagram illustrating an example of a heating system illustrated in FIG. 1.
Figure 3:
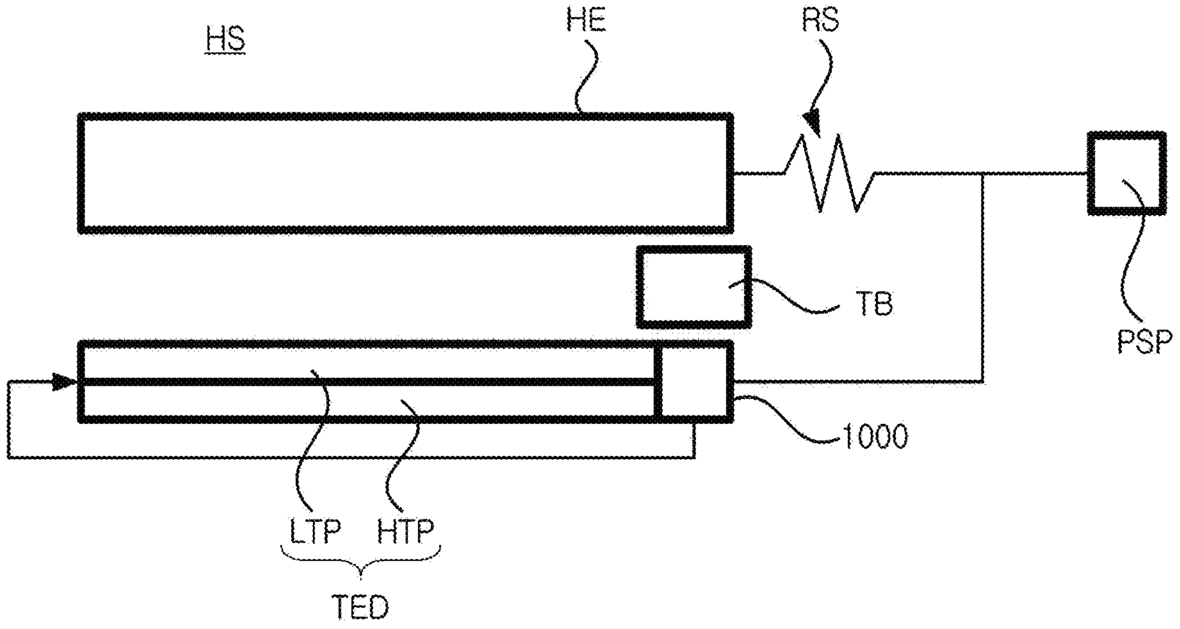
FIG. 3 is a diagram illustrating another example of a heating system illustrated in FIG. 1.

FIG. 1 is a view illustrating a small electronic device according to an embodiment of the present disclosure, FIG. 2 is a diagram illustrating an example of a heating system illustrated in FIG. 1, and FIG. 3 is a diagram illustrating another example of a heating system illustrated in FIG. 1.

Referring to FIGS. 1 to 3, an electronic device ED according to an embodiment of the present disclosure may perform a heating operation using a heating system HS. For example, the electronic device ED may be a heat generating device, and may generate heat using the heating system HS. In one example, the electronic device (ED) may be a portable heat generating device such as an electronic cigarette. However, while the electronic device is described herein as an example of a portable heat generating device, it is not limited thereto and may also be a medium-sized heat generating device or a large heat generating device. Hereinafter, for ease of explanation, the following description will focus on an embodiment in which the small heat generating device is an electronic cigarette.

The above-described electronic device ED may include a body part BP, a heating system HS, a cap part CPP, and a power supply part PSP.

The body part BP may provide a space in which the heating system HS is installed. The cap part CPP may be coupled to one side of the body part BP, and the power supply part PSP may be coupled to the other side of the body part BP.

The heating system HS may heat a cigarette-type electronic cigarette using a power that is provided through the power supply part PSP. As illustrated in FIGS. 2 and 3, the heating system HS may include a heating element HE, a thermoelectric device TED, and a switching device 1000.

The heating element HE may be electrically connected to the power supply part PSP. The heating element HE generates heat using the power that is supplied from the power supply part PSP, and thus may heat the cigarette-type electronic cigarette. That is, the heating element HE may be a heater capable of instantaneous heating, and may be provided in plurality. Further, the heating element HE may be inserted into the cigarette-type electronic cigarette to improve a fixing force to the cigarette-type electronic cigarette, and thus may prevent the cigarette-type electronic cigarette from falling out during smoking.

The thermoelectric device ED may be electrically connected to the power supply part PSP. In the heating system HS, the thermoelectric device TED may be connected in parallel with the heating element HE. The thermoelectric device TED may be provided with a low-temperature part LTP and a high-temperature part HTP. The low-temperature part LTP may be disposed adjacent to the heating element HE, and the high-temperature part HTP may be disposed to be spaced apart from the heating element HE.

The above-described thermoelectric device TED may be a Peltier device using a Peltier effect (thermoelectric effect). The Peltier effect is a phenomenon in which the temperature difference at both ends of multiple layers of conductive materials persists when current is applied thereto. In the Peltier device, if the high-temperature part HTP is forced to cool in direction opposite to the direction in which low-temperature cooling is required, the heat from the low-temperature part LTP in the direction in which the low-temperature cooling is required may be transferred to the high-temperature part HTP. Accordingly, in the Peltier device, the low-temperature part LTP may become cold and the high-temperature part HTP may become hot by the Seebeck effect. That is, when the low-temperature part LTP is cooled down, the high-temperature part HTP may be heated up.

The efficiency of the Peltier device is improved when the high-temperature part HTP is cooled, and if the high-temperature part HTP is overheated, the efficiency of the Peltier device may be decreased. In particular, if the high-temperature part HTP is overheated, the Peltier device may be damaged or heat inversion may occur, and thus the low-temperature part LTP and the high-temperature part HTP may be reversed. Accordingly, the high-temperature part HTP should dissipate heat through the body part BP, and a heat dissipation device (not shown) such as a heat sink may be provided between the high-temperature part HTP and the body part BP.

The switching device 1000 may be electrically connected to the thermoelectric device TED. For example, the switching device 1000 may be disposed between the power supply part PSP and the thermoelectric device TED, and may control the operation of the heating element HE and the thermoelectric device TED. In particular, the switching device 1000 may maintain the temperature of the heating element HE within a set temperature range by switching the current that is supplied to the thermoelectric device TED. Here, the set temperature may be a temperature suitable for the operation of the electronic device ED.

In an embodiment of the present disclosure, since the electronic device ED may be an electronic cigarette, the set temperature may be selected in the range of 100° C. or more. For example, to allow a user to smoke by heating the cigarette-type electronic cigarette, the set temperature may be 100° C.

In the heating system HS, the switching device 1000 may be connected in parallel with the heating element HE. That is, the thermoelectric device TED and the switching device 1000 may be connected in series, and the heating element HE and the switching device 1000 may be connected in parallel.

The switching device 1000 may exhibit a metal-insulator transition (MIT). Accordingly, the switching device 1000 may apply or cut off the current according to the temperature. The switching device 1000 may switch the current through the metal-insulator transition by a vanadium dioxide ($VO_2$) functional thin film. The phase transition temperature of the switching device 1000 may be lower than the set temperature.

The resistance of the switching device 1000 may vary with the temperature. For example, since the switching device 100 has the metal-insulator transition, the switching device 1000 may have a first resistance value R1 at a temperature that is equal to or lower than a phase transition temperature at which the metal-insulator transition of the switching device occurs, and may have a second resistance value R2 in a temperature range that exceeds the phase transition temperature. Here, R1/R2 may be equal to or greater than 17000. That is, at the temperature that is equal to or lower than the phase transition temperature, the switching device 1000 may have insulating characteristics, while in the temperature range exceeding the phase transition temperature, the switching device 100 may have the same characteristic as that of a conductor.

The first resistance value (R1) of the switching device 1000 may be larger than the resistance value of the heating element HE. Accordingly, since the switching device 1000 has the same insulating characteristic as that of an insulator at the temperature that is equal to or lower than the set temperature, the power applied from the power supply part PSP is supplied to the heating element HE, and thus the cigarette-type electronic cigarette may be heated.

Further, the second resistance value (R2) may be smaller than the resistance value of the heating element HE. Accordingly, since the switching device 1000 has the same conduction characteristic as that of the conductor in the temperature range that exceeds the set temperature, the power supplied from the power supply part PSP is supplied to the thermoelectric device TED, and thus the heating element HE may be cooled by the low-temperature part LTP of the thermoelectric device TED.

Meanwhile, if the switching device 1000 is disposed adjacent to the heating element HE, the heat of the heating element HE may be quickly transferred to the switching device 1000. In this case, the temperature of the switching device 1000 may reach the phase transition temperature before the temperature of the electronic device ED reaches the set temperature. If the temperature of the switching device 1000 reaches the phase transition temperature before the temperature of the electronic device ED reaches the set temperature, the switching device 1000 will work, causing insufficient heating of the heating element HE of the electronic device ED. Therefore, as illustrated in FIG. 3, a thermal buffer TB may be provided between the heating element HE and the switching device 100, and it may buffer the transfer of the heat generated from the heating element HE to the switching device 1000. That is, the thermal buffer TB may delay or buffer the transfer of the heat from the heating element HE to the switching device 1000. For example, the thermal buffer TB may allow the phase transition of the switching device 1000 to occur at a temperature that is lower than the set temperature by adjusting the rate of heat transfer from the heating element HE to the switching device 1000. Further, the thermal buffer TB can maintain the temperature of the heating element HE at a temperature that is higher than the phase transition temperature, for example, within the set temperature range by adjusting the rate of heat transfer from the heating element HE to the switching device 1000.

The thermal buffer TB may prevent the switching device 1000 from being damaged by thermal shock by preventing the heat from being abruptly transferred from the heating element HE to the switching device 1000.

The thermal buffer TB may include a metal, a ceramic, a special alloy, or a composite material, and may be selected in consideration of the set temperature, the phase transition temperature, and the heat transfer rate depending on how the electronic device ED works.

The cap part CPP may be coupled to one side of the body part BP, and may provide a space into which the cigarette-type electronic cigarette may be inserted. That is, the cap part CPP may protect the cigarette-type electronic cigarette and the heating element HE of the heating system HS from being exposed to outside, and can fix the cigarette-type electronic cigarette coupled to the heating element HE more firmly. Accordingly, the cigarette-type electronic cigarette may be prevented from falling out of the cap part CPP.

The cap part CPP may be provided in a cylindrical shape with both sides open and may be provided with a space capable of accommodating therein the component of the body part BP, such as the heating element HE of the heating system HS.

The power supply part PSP may be coupled to the other side of the body part BP. The power supply part PSP supplies the power to the heating element HE of the heating system HS under the control of the heating system HS, thereby heating the cigarette-type electronic cigarette.

The power supply part PSP may include a power storage device such as a rechargeable battery, and may supply the power stored in the power storage device to the heating system HS. Meanwhile, the power supply part PSP in an embodiment of the present disclosure is described as an example of including the power storage device such as a rechargeable battery, but it is not limited thereto. For example, the power supply part PSP may also include a power transmission device that is connected to an external power source and transfers the power of the external power source to the heating system HS.

In an embodiment of the present disclosure, the heating system HS may further include a resistor RS disposed between the power supply part PSP and the heating element HE and connected in series to the power supply part PSP. Here, the resistor RS may have a resistance value between the first resistance value R1 and the second resistance value R2. For example, the resistance value of the resistor RS may be the medium value of the first resistance value R1 and the second resistance value R2.

As described above, the electronic device ED according to an embodiment of the present disclosure may include the heating system HS, and the heating system HS may include the thermoelectric device TED and the switching device 1000. Here, when the heating element HE is heated above the set temperature, the switching device 1000 may cut off the power that is supplied from the power supply part PSP to the heating element HE, and may enable the power to be supplied to the thermoelectric device TED. When the power is supplied to the thermoelectric device TED, the low-power part LTP disposed adjacent to the heating element HE may be cooled, and thus the heating element HE may be cooled rapidly.

Further, since the difference between the first resistance value R1 at the temperature that is equal to or lower than the set temperature and the second resistance value R2 in the temperature range that exceeds the set temperature is very large, it is not necessary for the electronic device ED according to an embodiment of the present disclosure to have a separate control device such as a separate proportional-integral-differential controller for cutting off the power that is supplied to the heating element HE.

Meanwhile, in the present disclosure, the electronic device ED in the present disclosure is described as an example of a small electronic device such as an electronic cigarette, but it is not limited thereto. For example, the electronic device ED may be an electronic device that includes functions of cutting off the current that is supplied to the heating source and diverting the current to a cooling device capable of cooling the heating source such as the thermoelectric device TED.

In addition, the switching device 1000 of the electronic device ED according to an embodiment of the present disclosure may also be applied to a fire detection system or a fire detection device. For example, the switching device 1000 may be applied to the fire detection system or the fire detection device that operates above the set temperature.

The switching device 1000 is described in more detail below with reference to FIGS. 4 to 13.

Figure 4:
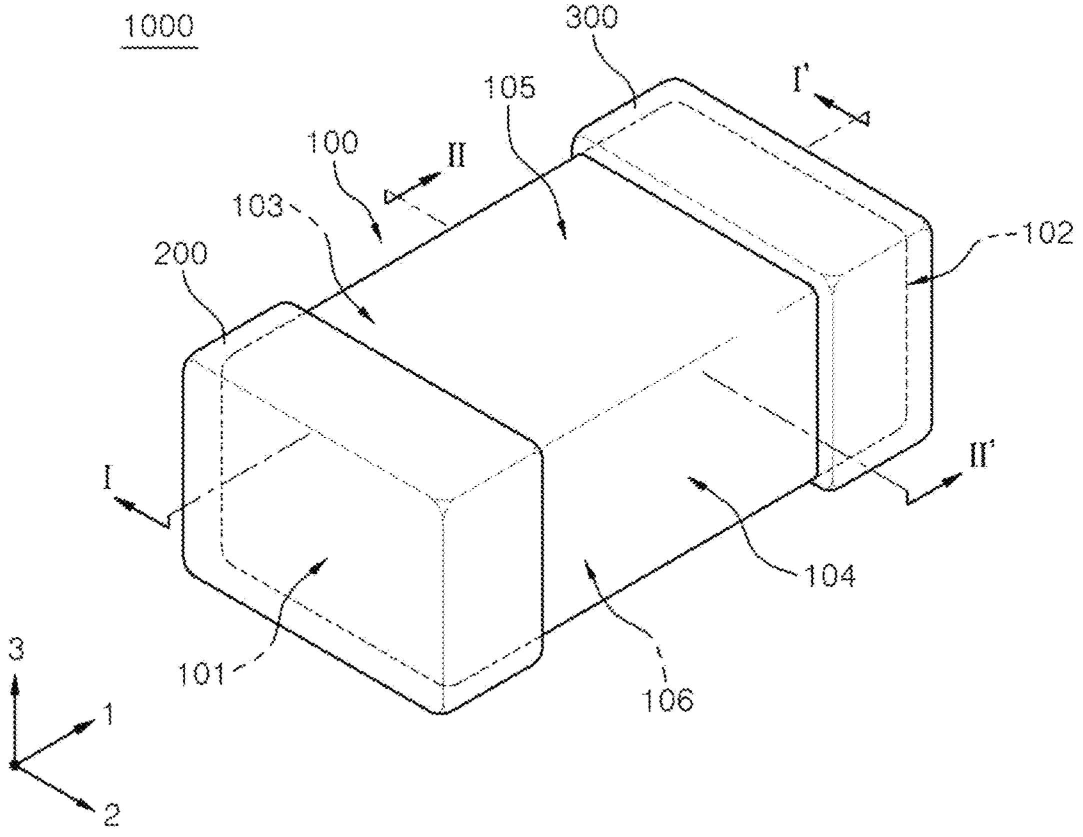
FIG. 4 is a view schematically representing a switching device that is an energy-sensitive electronic component according to an embodiment of the present disclosure.
Figure 5:
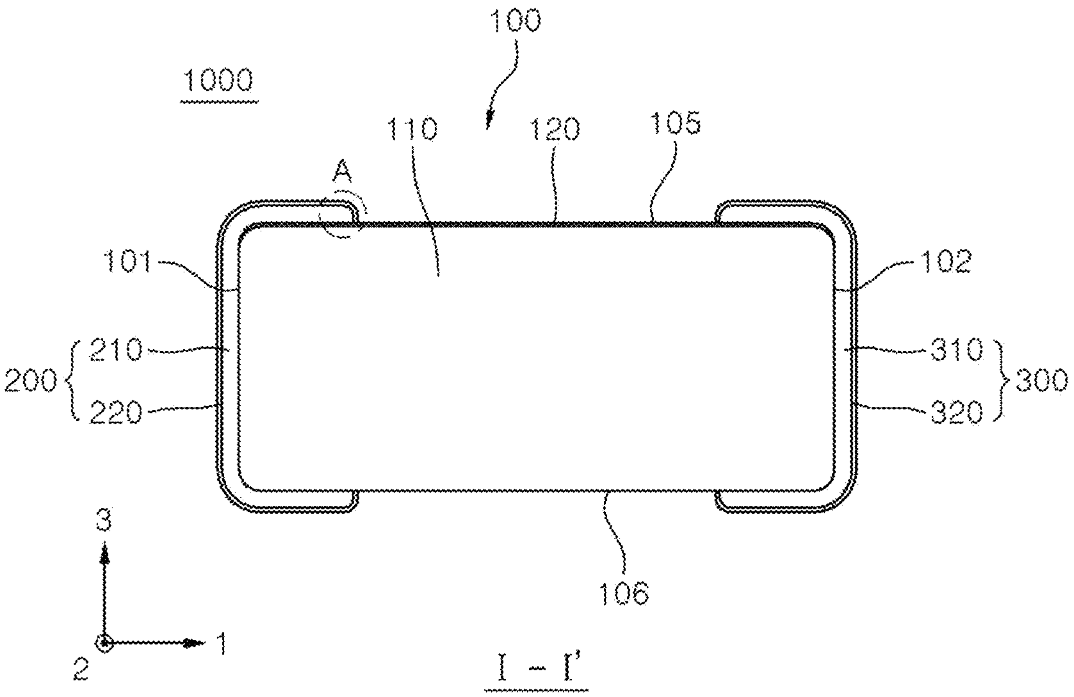
FIG. 5 is a view representing a cross section taken along line I-I' of FIG. 4.
Figure 6:
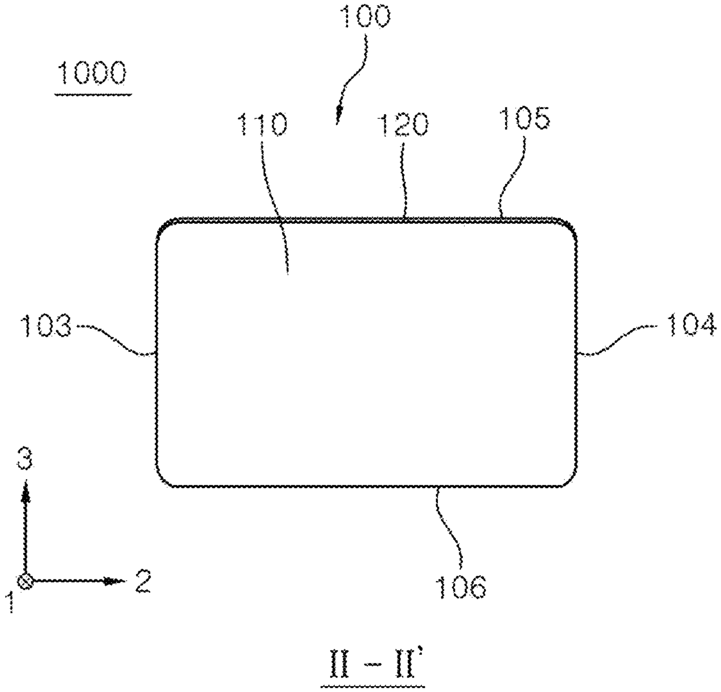
FIG. 6 is a view representing a cross section taken along line II-II' of FIG. 4.
Figure 7:
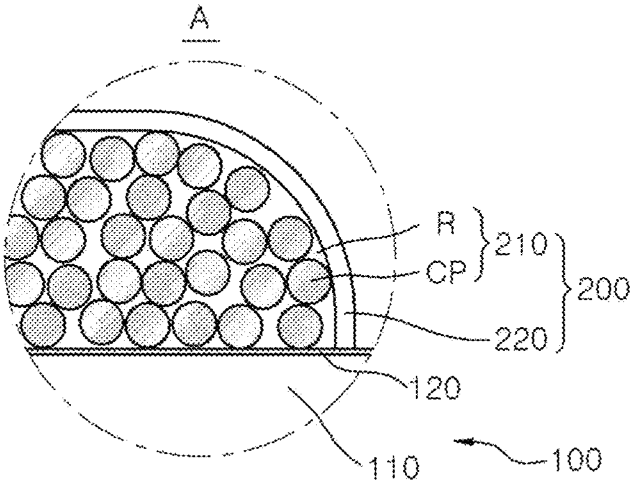
FIG. 7 is a view illustrating A of FIG. 5 in an enlarged manner.

FIG. 4 is a view schematically representing a switching device that is an energy-sensitive electronic component according to an embodiment of the present disclosure, FIG. 5 is a view representing a cross section taken along line I-I' of FIG. 4, FIG. 6 is a view representing a cross section taken along line II-II' of FIG. 4, and FIG. 7 is a view illustrating A of FIG. 5 in an enlarged manner.

The switching device 1000 according to an embodiment of the present disclosure may have the metal-insulator transition (MIT). Accordingly, the switching device 1000 may apply or cut off the current according to the temperature.

The switching device 1000 according to an embodiment of the present disclosure switches the current by the metal-insulator transition through a vanadium dioxide ($VO_2$) functional thin film.

The phase transition temperature of the switching device 1000 according to an embodiment of the present disclosure may be lower than the set temperature. As an example, the metal-insulator transition of the switching device 1000 may appear near 67° C.

More specifically, referring to FIGS. 4 to 7, the switching device 1000 according to an embodiment of the present disclosure includes a thin film substrate 100, a first external electrode 200, and a second external electrode 300. The thin film substrate 100 includes a base substrate 110 and a functional thin film 120.

The thin film substrate 100 may form the overall appearance of the switching device 1000 according to the present embodiment. The thin film substrate 100 may be formed in an overall hexahedral shape. Hereinafter, the thin film substrate 100 is referred to as a body 100 on the point that the thin film substrate 100 forms the overall appearance of the switching device 1000.

Based on FIGS. 4 to 6, the body 100 includes a first surface 101 and a second surface 102 facing each other in a first direction 1, a third surface 103 and a fourth surface 104 facing each other in a second direction 2, and a fifth surface 105 and a sixth surface 106 facing each other in a third direction 3. Each of the first to fourth surfaces 101, 102, 103, and 104 of the body 100 corresponds to a wall surface of the body 100 connecting the fifth surface 105 and the sixth surface 106 of the body 100 with each other. Hereinafter, both end surfaces (one end surface and the other end surface) of the body 100 may mean the first surface 101 and the second surface 102 of the body 100, both side surfaces (one side surface and the other side surface) of the body 100 may mean the third surface 103 and the fourth surface 104 of the body 100, and one surface and the other surface of the body 100 may mean the sixth surface 106 and the fifth surface 105 of the body 100, respectively. Meanwhile, the body 100 includes the base substrate 110 and the functional thin film 120 disposed on the base substrate 110, and thus each of the first to fourth surfaces 101, 102, 103, and 104 of the body 100 may be composed of the base substrate 100 and the functional thin film 120. Further, the sixth surface 106 of the body 100 may be substantially composed of only the base substrate 100, and the fifth surface 105 of the body 100 may be substantially composed of only the functional thin film 120. In mounting the switching device 1000 according to the present embodiment on a mounting board such as a printed circuit board, the sixth surface 106 of the body 100 may be mounted to be directed toward the upper surface of the mounting board, or the fifth surface 105 of the body 100 may be mounted to be directed toward the upper surface of the mounting board.

For example, the body 100 may be formed so that the electronic component 100 of the present embodiment, on which external electrodes 200 and 300 to be described later are formed, has a length of 7.4 mm and a width of 5.1 mm, has a length of 6.3 mm and a width of 3.2 mm, has a length of 5.0 mm and a width of 2.5 mm, has a length of 4.5 mm and a width of 3.2 mm, has a length of 4.5 mm and a width of 1.6 mm, has a length of 3.2 mm and a width of 2.5 mm, has a length of 3.2 mm and a width of 1.6 mm, has a length of 2.5 mm and a width of 2.0 mm, has a length of 2.0 mm and a width of 1.2 mm, has a length of 1.6 mm and a width of 0.8 mm, has a length of 1.0 mm and a width of 0.5 mm, has a length of 0.8 mm and a width of 0.4 mm, has a length of 0.6 mm and a width of 0.3 mm, or has a length of 0.4 mm and a width of 0.2 mm, but the length and the width of the switching device 1000 are not limited thereto. Meanwhile, since the above-described exemplary dimensions of the length and the width of the switching device 1000 are dimensions in which a process error is not reflected, the dimensions of the process error range that may be recognized as the process error should be viewed to correspond to the above-described exemplary dimensions. In addition, since the body 100 of the switching device 1000 may be formed by dicing the base substrate 110 in a wafer state after forming the functional thin film 120 on the base substrate 110 in the wafer state, the length and the width of the switching device 1000 may be substantially the same as the length and the width of the base substrate 110 and the length and the width of the functional thin film 120.

Here, the length of the switching device 1000 may mean a maximum value among dimensions according to the first direction 1 of each of a plurality of line segments that are parallel to the first direction 1 in a state where two boundary lines facing in the first direction 1 are connected, among outermost boundary lines of the switching device 1000 shown in an optical microscope photograph or an SEM photograph, based on the photograph for the cross sections (cross sections 1 to 3) of the switching device 1000 taken from a central part in the second direction 2 of the switching device 1000 to the first direction 1 to the third direction 3. Alternatively, the length of the switching device 1000 may mean a minimum value among the dimensions according to the first direction 1 of each of the plurality of line segments that are parallel to the first direction 1 in a state where two boundary lines facing in the first direction 1 are connected, among the outermost boundary lines of the switching device 1000 shown in the photo. Alternatively, the length of the switching device 1000 may mean an arithmetic mean value of the dimensions according to the first direction 1 of at least two of the plurality of line segments that are parallel to the first direction 1 in a state where two boundary lines facing in the first direction 1 are connected, among the outermost boundary lines of the switching device 1000 shown in the photograph.

Here, the width of the switching device 1000 may mean a maximum value among dimensions according to the second direction 2 of each of the plurality of line segments that are parallel to the second direction 2 in a state where two boundary lines facing in the second direction 2 are connected, among the outermost boundary lines of the switching device 1000 shown in the optical microscope photograph or the SEM photograph, based on the cross section photo for the cross sections (cross sections 1-2) of the switching device 1000 taken from the central part in the third direction 3 of the switching device 1000 to the first direction 1 to the second direction 2. Alternatively, the width of the switching device 1000 may mean a minimum value among the dimensions according to the second direction 2 of each of the plurality of line segments that are parallel to the second direction 2 in a state where two boundary lines facing in the second direction 2 are connected, among the outermost boundary lines of the switching device 1000 shown in the cross section photograph. Alternatively, the width of the switching device 1000 may mean an arithmetic mean value of the dimensions according to the second direction 2 of at least two of the plurality of line segments that are parallel to the second direction 2 in a state where two boundary lines facing in the second direction 2 are connected, among the outermost boundary lines of the switching device 1000 shown in the cross section photo.

Here, the thickness of the switching device 1000 may mean a maximum value among dimensions according to the third direction 3 of each of a plurality of line segments that are parallel to the third direction 3 in a state where two boundary lines facing in the third direction 3 are connected among outermost boundary lines of the switching device 1000 shown in an optical microscope photo or a SEM photo, based on the cross section photo for the cross sections (cross sections 1-3) of the switching device 1000 taken from a central part in the second direction 2 of the switching device 1000 to the first direction 1 to the third direction 3. Alternatively, the thickness of the switching device 1000 may mean a minimum value among the dimensions according to the third direction 3 of each of the plurality of line segments that are parallel to the third direction 3 in a state where two boundary lines facing in the third direction 3 are connected, among the outermost boundary lines of the switching device 1000 shown in the cross section photograph. Alternatively, the width of the switching device 1000 may mean an arithmetic mean value of the dimensions according to the third direction 3 of at least two of the plurality of line segments that are parallel to the third direction 3 in a state where two boundary lines facing in the third direction 3 are connected, among the outermost boundary lines of the switching device 1000 shown in the cross section photograph.

Alternatively, the length, width, or thickness of the electronic components 1000 may be measured by a micrometer measurement method. The micrometer measurement method may measure the length, width, or thickness of the switching device 1000 by turning a measurement lever of a micrometer in a state where the zero point is set by the micrometer with gage R&R (repeatability and reproducibility), and the electronic component 100 according to the present embodiment is inserted between tips of the micrometer. Meanwhile, in measuring the length of the switching device 1000 through the micrometer measurement method, the length of the switching device 1000 may mean a value once measured or an arithmetic mean value of values measured plural times. This may be equally applied even to the width and the thickness of the switching device 1000.

The body 100 includes the base substrate 110 and the functional thin film 120. Specifically, the body 100 includes the base substrate 110 and the functional thin film 120 disposed on one surface of the base substrate 110 (upper surface of the base substrate 110 based on the directions of FIGS. 4 to 6).

The base substrate 110 may be a single crystal substrate. The base substrate 110 may grow in one direction and become crystalline. As an example, the base substrate 110 may be an $Al_2O_3$ single crystal substrate, Si single crystal substrate, SiC single crystal substrate, Ge single crystal substrate, TiO2 single crystal substrate, ZnO single crystal substrate, ZnS single crystal substrate, ZnSe single crystal substrate, ZnTe single crystal substrate, CdS single crystal substrate, CdSe single crystal substrate, CdTe single crystal substrate, GaAs single crystal substrate, GaP single crystal substrate, GaSb single crystal substrate, InAs single crystal substrate, InP single crystal substrate, $SrTiO_3$ single crystal substrate, or MgO single crystal substrate.

The functional thin film 120 may be a $VO_2$ thin film doped with Ti.

As a non-limiting example, the functional thin film 120 may be formed on the base substrate 110 by forming a $TiO_2$ sacrificial layer on the base substrate 110, forming a $VO_2$ main oxide thin film layer on the sacrificial layer, and performing post heat treatment of the sacrificial layer and the main oxide thin film layer.

Here, the sacrificial layer may be grown on the upper surface of the base substrate 110 in a predetermined direction along a crystal orientation of the base substrate 110. That is, the sacrificial layer may be pre-crystallized prior to forming the main oxide thin film layer. The thickness of the sacrificial layer may be, for example, 1 nm to 50 nm, but the scope of the present disclosure is not limited thereto, and the thickness of the sacrificial layer may be appropriately varied depending on the Ti ion concentration on the designed functional thin film 120. The sacrificial layer may be formed through a thin film process such as, for example, physical vapor deposition (PECVD) such as sputtering, pulse laser deposition (PLD), and e-beam evaporation, chemical vapor deposition (PECVD or MOCVD), atomic layer deposition (ALD), and molecular beam epitaxy (MBE).

Here, the main oxide thin film layer may be crystallized in a predetermined direction according to the crystal orientation of the sacrificial layer, or may become amorphous. In case that the post heat treatment process follows after the main oxide thin film is formed, the main oxide thin film layer may be formed on the sacrificial layer in an amorphous state. The thickness of the main oxide thin film layer may be, for example, 10 nm to 1000 nm, but the scope of the present disclosure is not limited thereto, and the thickness of the main oxide thin film layer may be appropriately varied depending on the Ti ion concentration on the designed functional thin film 120. The main oxide thin film layer may be formed through a thin film process such as, for example, physical vapor deposition (PECVD) such as sputtering, pulse laser deposition (PLD), and e-beam evaporation, chemical vapor deposition (PECVD or MOCVD), atomic layer deposition (ALD), and molecular beam epitaxy (MBE).

Here, the post heat treatment may be a process for integrating the sacrificial layer and the main oxide thin film layer. Specifically, the post heat treatment may be an integration process to remove boundaries between the sacrificial layer and the main oxide thin film layer by doping of a material that makes the sacrificial layer into the main oxide thin film layer. The post heat treatment may be performed, for example, by using equipment such as a box furnace, a tube furnace, or a rapid thermal annealing furnace (RTA). The post heat treatment may be performed, for example, at an atmosphere of one or more of air, oxygen ($O_2$), nitrogen ($N_2$), argon (Ar), and hydrogen ($H_2$). The post heat treatment may be performed, for example, at a temperature range of 400° C. to 800° C.

The crystal structure and orientation of the functional thin film 120 that is formed through the post heat treatment process may be determined, for example, according to the crystal structure and orientation of the sacrificial layer. For example, the functional thin film 120 that becomes integrated by post-heat-treating the sacrificial layer and the main oxide thin film layer may be crystallized in a predetermined direction according to the crystal orientation of the sacrificial layer before the post heat treatment. In this case, the crystal orientations of the functional thin film 120 and the sacrificial layer may not necessarily be the same. For example, the functional thin film 120 may have a crystal lattice spacing that is substantially the same as that of the sacrificial layer, but may be crystallized through being grown in a direction different from the direction of the crystal sacrificial layer. Further, since the metal ionic radius of the sacrificial layer is similar to the metal ionic radius of the main oxide thin film layer ($Ti^{4+}$ ionic radius is 0.60 Å, and $V^{4+}$ ionic radius is 0.58 Å), the metal ions of the sacrificial layer may be able to self-spread without substantially changing the $VO_2$ crystal structure during the post heat treatment process.

If it is assumed that the resistance of the functional thin film 120 at 25° C. is R1 and the resistance thereof at 80° C. is R2, R1/R2 of the functional thin film 120 may be more than equal to 104. The R1/R2 of the functional thin film 120 may be, for example, 17000 or more. By implanting the R1/R2 of the functional thin film 120 more than equal to 104, the switching device 1000 according to the present embodiment may detect more sensitively the energy change at a temperature in the range of 25° C. to 80° C.

If it is assumed that a heating process from 25° C. to 80° C. and a cooling process from 80° C. to 25° C. constitute one cycle, the functional thin film 120 may satisfy at least one of a) a change ($V_{\Delta T}$) of a hysteresis temperature difference ($\Delta T$) is less than equal to 1° C. for 10 cycles, b) a change ($V_{TMI}$) of a phase transition temperature ($T_{MI}$) is less than equal to 1.5° C. for 10 cycles, and c) a change rate ($V_{R1/R2}$) of R1/R2 is less than equal to 5% for 10 cycles.

Here, if it is assumed that, based on any one cycle, the temperature when an absolute value of a temperature coefficient of resistance (TCR) of the functional thin film 120 that is defined by Equation 1 below in the heating process is maximum is TH, and the temperature when the absolute value of the temperature coefficient of resistance (TCR) of the functional thin film 120 that is defined by Equation 1 below in the cooling process is maximum is Tc, the hysteresis temperature difference ($\Delta T$) of the functional thin film 120 may mean a difference between $T_H$ and Tc. The hysteresis temperature difference ($\Delta T$) of the functional thin film 120 may be less than equal to 1° C., and for example, may be less than equal to 0.726° C. If the hysteresis temperature difference ($\Delta T$) of the functional thin film 120 is less than equal to PC, it may be seen that there is substantially no thermal hysteresis during the corresponding cycle. As a result, for the functional thin film 120, the temperature in the heating process may be substantially the same as the temperature in the cooling process with respect to the same resistance within the temperature range of the heating and cooling processes. Accordingly, unlike the conventional electronic component in which the temperature varies depending on the heating process or the cooling process even if the resistance is the same, the switching device 1000 according to the present embodiment can detect the energy change relatively accurately.

$$TCR(/°C.) = -(1/R)*(dR/dT) \qquad \text{[Equation 1]}$$

Further, for example, in case of performing the heating process and the cooling process from the first cycle to the tenth cycle with respect to the functional thin film 120, the change ($V_{\Delta T}$) in hysteresis temperature difference ($\Delta T$) for 10 cycles of the functional thin film 120 may mean a difference between the maximum value and the minimum value of the hysteresis temperature differences ($\Delta T1$, $\Delta T2$, . . . , $\Delta T10$) of the functional thin film 120 obtained in the first to tenth cycles ($V_{\Delta T}$=|Max($\Delta T1$, $\Delta T2$, . . . , $\Delta T10$)−Min ($\Delta T1$, $\Delta T2$, . . . , $\Delta T10$)|). Alternatively, for example, in case of performing the heating process and the cooling process from the first cycle to the tenth cycle with respect to the functional thin film 120, the change ($V_{\Delta T}$) in hysteresis temperature difference ($\Delta T$) for 10 cycles of the functional thin film 120 may mean a difference between the hysteresis temperature difference ($\Delta T1$) of the functional thin film 120 in the first cycle and the hysteresis temperature difference ($\Delta T10$) of the functional thin film 120 in the tenth cycle ($V_{\Delta T}=|\Delta T1-\Delta T10|$). If the change ($V_{\Delta T}$) in hysteresis temperature difference ($\Delta T$) for 10 cycles of the functional thin film 120 is less than equal to 1° C., it may be seen that the functional thin film 120 has a substantially constant hysteresis temperature difference ($\Delta T$) even if the cycle increases. As a result, the functional thin film 120 can detect an accurate energy change repeatedly and stably within the temperature range of the heating and cooling processes. Accordingly, the switching device 1000 of the present embodiment may have improved repeatability for accuracy.

Here, the phase transition temperature ($T_{MI}$) of the functional thin film 120 may be defined by Equation 2 below. That is, the phase transition temperature ($T_{MI}$) of the functional thin film 120 may mean a half of the difference between $T_H$ and Tc in any one cycle. The phase transition temperature ($T_{MI}$) of the functional thin film 120 may be less than equal to 54° C., and for example, may be 52.4° C., 53.1° C., or 53.5° C., but the scope of the present disclosure is not limited thereto. Specifically, the phase transition temperature ($T_{MI}$) of the functional thin film 120 may be varied by the content of Ti ions doped into the functional thin film 120. If the phase transition temperature ($T_{MI}$) of the functional thin film 120 is less than equal to 54° C., metal-insulator transition (MIT) phenomenon may be used in a relatively low temperature area. Accordingly, the switching device 1000 according to the present embodiment may be used as a switching component in a relatively low temperature area.

$$T_{MI}(°C.) = |T_H - T_C|/2 \qquad \text{[Equation 2]}$$

Further, for example, in case of performing the heating process and the cooling process from the first cycle to the tenth cycle with respect to the functional thin film 120, the change ($V_{TMI}$) in phase transition temperature ($T_{MI}$) for 10 cycles of the functional thin film 120 may mean a difference between the maximum value and the minimum value of the phase transition temperatures ($T_{MI1}$, $T_{MI2}$, . . . , $T_{MI10}$) of the functional thin film 120 obtained in the first to tenth cycles ($V_{TMI}=|\mathrm{Max}(T_{MI1}, T_{MI2}, \ldots, T_{MI10})-\mathrm{Min}(T_{MI1}, T_{MI2}, \ldots, T_{MI10})|$. Alternatively, for example, in case of performing the heating process and the cooling process from the first cycle to the tenth cycle with respect to the functional thin film 120, the change ($V_{TMI}$) in phase transition temperature ($T_{MI}$) for 10 cycles of the functional thin film 120 may mean a difference between the phase transition temperature (TMI1) of the functional thin film 120 in the first cycle and the phase transition temperature (TMI10) of the functional thin film 120 in the tenth cycle ($V_{TMI}=|T_{MI1}-T_{MI10}|$). If the change ($V_{TMI}$) in phase transition temperature ($T_{MI}$) for 10 cycles of the functional thin film 120 is less than equal to 1.5° C., it may be seen that the functional thin film 120 has a substantially constant phase transition temperature ($T_{MI}$) even if the cycle increases. As a result, the functional thin film 120 can implement the switching function repeatedly and stably within the temperature range of the heating and cooling processes. Accordingly, the switching device 1000 according to the present embodiment may be repeatedly used as a switching component regardless of the number of operations in a relatively low temperature area.

Here, for example, in case of performing the heating process and the cooling process from the first cycle to the tenth cycle with respect to the functional thin film 120, the change rate ($V_{R1/R2}$) of R1/R2 for 10 cycles of the functional thin film 120 may mean a percentage of a value obtained by dividing a difference between the maximum value and the minimum value of R1/R2 values ($(R1/R2)_1$, $(R1/R2)_2$ . . . , $(R1/R2)_{10}$) of the functional thin film 120, which are obtained in the first cycle to the tenth cycle, respectively, by the maximum value ($V_{R1/R2}=100*(|\mathrm{Max}((R1/R2)_1, (R1/R2)_2 \ldots, (R1/R2)_{10})-\mathrm{Min}((R1/R2)_1, (R1/R2)_2 \ldots, (R1/R2)_{10})|)/\mathrm{Max}((R1/R2)_1, (R1/R2)_2 \ldots, (R1/R2)_{10})$). Alternatively, for example, in case of performing the heating process and the cooling process from the first cycle to the tenth cycle with respect to the functional thin film 120, the change rate ($V_{R1/R2}$) of R1/R2 for 10 cycles of the functional thin film 120 may mean a percentage of a difference between the R1/R2 value ($(R1/R2)_1$) of the functional thin film 120 in the first cycle and the R1/R2 value ($(R1/R2)_{10}$) of the functional thin film 120 in the tenth cycle to the R1/R2 value ($(R1/R2)_1$) of the functional thin film 120 in the first cycle ($V_{R1/R2}=100*(|(R1/R2)_1-(R1/R2)_{10}|)/(R1/R2)_1$). If the change rate ($V_{R1/R2}$) of R1/R2 for 10 cycles of the functional thin film 120 is about less than equal to 5%, it may be seen that the functional thin film 120 has a substantially constant value of R1/R2 even if the cycle increases. As a result, the functional thin film 120 may detect a sensitive energy change repeatedly and stably within the temperature range of the heating and cooling processes. Accordingly, the switching device 1000 according to the present embodiment can have improved repeatability for sensitivity.

The external electrodes 200 and 300 are disposed to be spaced apart from each other on the body 100. That is, the external electrodes 200 and 300 are disposed in the form of being spaced apart from each other on the base substrate 110 and/or the functional thin film 120. Each of the external electrodes 200 and 300 is connected to come in contact with the functional thin film 120. The external electrodes 200 and 300 may be formed by at least one of vapor deposition such as sputtering, plating, and conductive paste applying and curing. The external electrodes 200 and 300 may include a conductive material, such as platinum (Pt), gold (Au), chrome (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), cobalt (Co), or an alloy thereof. The external electrodes 200 and 300 may be formed in a single or double layer structure.

The external electrodes 200 and 300 include conductive resin layers 210 and 310 and metal layers 220 and 320 formed on the conductive resin layers 210 and 310, respectively. Specifically, the first external electrode 200 includes the first conductive resin layer 210 formed on the body 100 and a first metal layer 220 formed on the first conductive resin layer 210. The second external electrode 300 includes the second conductive resin layer 310 formed on the body 100 and the second metal layer 320.

The first conductive resin layer 210 is disposed on the first surface 101 of the body 100, and is extended to at least a portion of each of the third to sixth surfaces 103, 104, 105, and 106 of the body 100. The first conductive resin layer 210 comes in contact with one end portion on the first surface 101 side of the body 100 of the functional thin film 120. The second conductive resin layer 310 is disposed on the second surface 102 of the body 100, and is extended to at least a portion of each of the third to sixth surfaces 103, 104, 105, and 106 of the body 100. The second conductive resin layer 310 comes in contact with the other end portion on the second surface 102 side of the body 100 of the functional thin film 120. The first and second conductive resin layers 210 and 310 are disposed to be spaced apart from each other on the third to sixth surfaces 103, 104, 105, and 106 of the body 100. Meanwhile, in FIGS. 4 to 6, each of the conductive resin layers 210 and 310 is illustrated so as to be formed on five surfaces of the body 100 as a normal type, but this is merely exemplary. That is, depending on the design, each of the conductive resin layers 210 and 310 may be transformed into one of a C type (e.g., in which the first conductive resin layer 210 is disposed only on the first surface 101, the fifth surface 105, and the sixth surface 106), an L type (e.g., in which the first conductive resin layer 210 is disposed only on the first surface 101 and the fifth surface 105 of the body 100, or is disposed only on the first surface 101 and the sixth surface 106 of the body 100), and a lower electrode type (e.g., in which the first conductive resin layer 210 is disposed only on the fifth surface 105 of the body 100).

Each of the conductive resin layers 210 and 310 includes a base resin R and conductive particles CP dispersed in the base resin R. The conductive particles CP may come in contact with each other in the base resin R, and may connect the external electrodes 200 and 300 and the functional thin film with each other. Each of the external electrodes 200 and 300 may be formed by applying conductive paste for forming the conductive resin layer onto the body 100 and then curing the conductive paste.

The base resin R may include a thermosetting resin having electrical insulation. The thermosetting resin may be, for example, an epoxy resin, but the present disclosure is not limited thereto.

The conductive particles CP may include at least one of platinum (Pt), gold (Au), chrome (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co). As a non-limiting example, the conductive particles CP may include at least one of platinum (Pt) particles, gold (Au) particles, chrome (Cr) particles, molybdenum (Mo) particles, nickel (Ni) particles, titanium (Ti) particles, silver (Ag) particles, aluminum (Al) particles, copper (Cu) particles, iron (Fe) particles, indium (In) particles, tin (Sn) particles, lead (Pb) particles, palladium (Pd) particles, zinc (Zn) particles, cobalt (Co) particles, and alloy particles composed of at least five of the above metals. As another example, the conductive particles CP may have a core-shell structure. Here, the core may include at least one of platinum (Pt), gold (Au), chrome (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co), and the shell may include at least another one of platinum (Pt), gold (Au), chrome (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co).

The conductive particles CP may be of a spherical type and/or flake type. The flake type may mean that the dimension according to any one of first to third directions 1, 2, and 3 is more than equal to 1.5 times larger than the dimension according to another one of the first to third directions 1, 2, and 3. Here, the direction of the larger of the above-described two dimensions may be defined as the major axis, and the direction of the smaller of the above-described two dimensions may be defined as the minor axis.

The metal layers 220 and 320 may be formed on the conductive resin layers 210 and 310, respectively. At least a portion of each of the metal layers 220 and 320 is disposed in an area of the conductive resin layers 210 and 310 which is formed on a mounting surface of the switching device 1000 according to the present embodiment.

As an example, if the mounting surface of the switching device 1000 of the present embodiment is the fifth surface 105 side of the body 100, the first metal layer 220 may be formed in an area of the first conductive resin layer 210 disposed on the fifth surface 105 of the body 100, and the second metal layer 320 may be formed in an area of the second conductive resin layer 310 disposed on the fifth surface 105 of the body 100. In this case, the first metal layer 220 may be formed on at least a portion of the first surface 101, the third surface 103, the fourth surface 104, and the sixth surface 106 of the body 100. Alternatively, the first metal layer 220 may not be formed on at least some of the first surface 101, the third surface 103, the fourth surface 104, and the sixth surface 106 of the body 100 even if the first conductive resin layer 210 is formed to be extended to each of the first surface 101, the third surface 103, the fourth surface 104, and the sixth surface 106 of the body 100. In this case, the second metal layer 320 may be formed on at least a portion of the second surface 102, the third surface 103, the fourth surface 104 and the sixth surface of the body 100. Alternatively, the second metal layer 320 may not be formed on at least some of the second surface 102, the third surface 103, the fourth surface 104, and the sixth surface 106 of the body 100 even if the second conductive resin layer 310 is formed to be extended to each of the second surface 102, the third surface 103, the fourth surface 104, and the sixth surface 106 of the body 100.

As another example, if the mounting surface of the switching device 1000 of the present embodiment is the sixth surface 106 side of the body 100, the first metal layer 220 may be formed in an area of the first conductive resin layer 210 disposed on the sixth surface 106 of the body 100, and the second metal layer 320 may be formed in an area of the second conductive resin layer 310 disposed on the sixth surface 106 of the body 100. In this case, the first metal layer 220 may be formed on at least a portion of the first surface 101 and the third to fifth surfaces 103, 104, and 105 of the body 100. Alternatively, the first metal layer 220 may not be formed on at least some of the first surface 101 and the third to fifth surfaces 103, 104, and 105 of the body 100 even if the first conductive resin layer 210 is formed to be extended to each of the first surface 101 and the third to fifth surfaces 103, 104, and 105 of the body 100. In this case, the second metal layer 320 may be formed on at least some of the second to fifth surfaces 102, 103, 104, and 105 of the body 100. Alternatively, the second metal layer 320 may not be formed on at least some of the second to fifth surfaces 102, 103, 104, and 105 of the body 100 even if the second conductive resin layer 310 is formed to be extended to each of the second to fifth surfaces 102, 103, 104, and 105 of the body 100.

Each of the metal layers 220 and 320 may include at least one of platinum (Pt), gold (Au), chrome (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co).

Each of the metal layers 220 and 320 may be formed as a single layer or a double layer. Metal layers 220 and 320 may be formed by at least one of vapor deposition such as sputtering and plating. As a non-limiting example, the metal layers 220 and 320 may include first plating layers 221 and 321 formed on the conductive resin layers 210 and 310 and second plating layers 222 and 322 formed on the first plating layers 221 and 321, respectively. As a non-limiting example, the first plating layers 221 and 321 may be nickel plating layers, and the second plating layers 222 and 322 may be tin plating layers. Meanwhile, if the area in which the conductive resin layers 210 and 310 are formed is different from the area in which the metal layers 220 and 320 are formed on the first to sixth surfaces 101, 102, 103, 104, 105, and 106 of the body 100, as an example, a resist forming process for exposing only some of outer surfaces of the conductive resin layers 210 and 310 may be added between a process for forming the conductive resin layers 210 and 310 and a process of forming the metal layers 220 and 320.

Experimental Examples

Method for Manufacturing Experimental Examples 1 and 2

Experimental example 1 was manufactured by the following method. First, as a sacrificial layer, a $TiO_2$ thin film (with a thickness of 3 nm to 5 nm) was formed on a sapphire ($Al_2O_3$) single crystal substrate by sputtering. Next, as a main oxide thin film layer, a $VO_2$ thin film (with a thickness of 200 nm to 300 nm) was formed on the sacrificial layer by sputtering. In order to form the $VO_2$ thin film, deposition was performed by supplying an Ar gas with a process temperature of room temperature and a process pressure of 10-30 mtorr. Next, by performing post heat treatment of the sacrificial layer and the main oxide thin film layer at 400° C. to 800° C., a functional thin film, in which at least some of V ions of a $VO_2$ crystal lattice had been replaced (doped) with Ti ions, was produced. Hereinafter, the thin film (functional thin film) finally manufactured according to the Experimental example 1 is called a first thin film.

As compared to the Experimental example 1, Experimental example 2 was manufactured in the same method as the method of the Experimental example 1 except that the sacrificial layer of the Experimental example 1 is not deposited. That is, the Experimental example 2 was manufactured by directly forming a main oxide thin film layer ($VO_2$) on the sapphire ($Al_2O_3$) single crystal substrate used for the Experimental example 2 under the same condition as the main oxide thin film layer forming condition of the Experimental example 1, and then by performing post heat treatment of the main oxide thin film layer under the same condition as the post heat treatment condition of the Experimental example 1. Hereinafter, the thin film (post-heat-treated functional thin film) finally manufactured according to the Experimental example 2 is called a second thin film.

(Characteristic Evaluation of First and Second Thin Films for Thermal Cycles)

The resistance according to the temperature of the first and second thin films was measured while a thermal cycle that is composed of a heating process from 25° C. to 80° C. and a cooling process from 80° C. to 25° C. was performed multiple times with respect to the first and second thin films.

The heating and cooling of the first and second thin films was implemented by mounting a heater capable of generating heat on a lower part of the sapphire substrate on which the first and second thin films were formed and by adjusting the power that was applied to the heater. Specifically, the first and second thin films were heated by supplying the power to the heater at room temperature (25° C.), and when the temperature of the first and second thin films reaches 80° C., the first and second thin films were cooled by cutting off the power to the heater.

The surface temperature of the first and second thin films was measured by Nanovoltmeter (Model No. Keithley 2182A) of Keithley Instruments in a state where a contact temperature probe (k-type thermocouple; 0.005 inches thermocouple wire) of Omega Engineering is attached to the first and second thin films.

The electrical resistance of the first and second thin films was derived by applying a constant voltage to the first and second thin films through the use of the product (Model No. Keithley 2400) of Keithley Instruments as a source meter, measuring current of the first and second thin films from the corresponding voltage, and then converting the measured current to electrical resistance (R=V/I). In this case, in order to reduce the contact resistance between the first and second thin films and a metal probe that measures the current, a metal thin film with a thickness of 100 nm was formed in some areas of the first and second thin films, and the current was measured by contacting the metal thin film with the metal probe.

Figure 8:
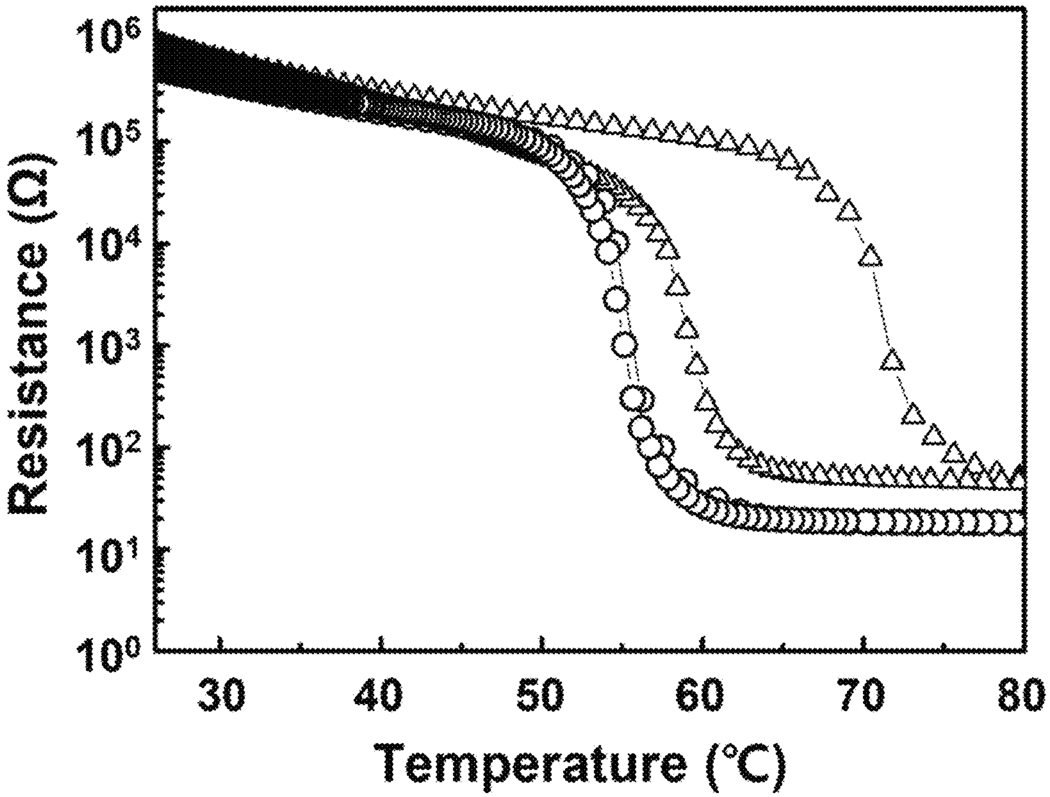
FIG. 8 is a graph representing resistance according to temperature during a first cycle in Experimental examples 1 and 2.
Figure 9:
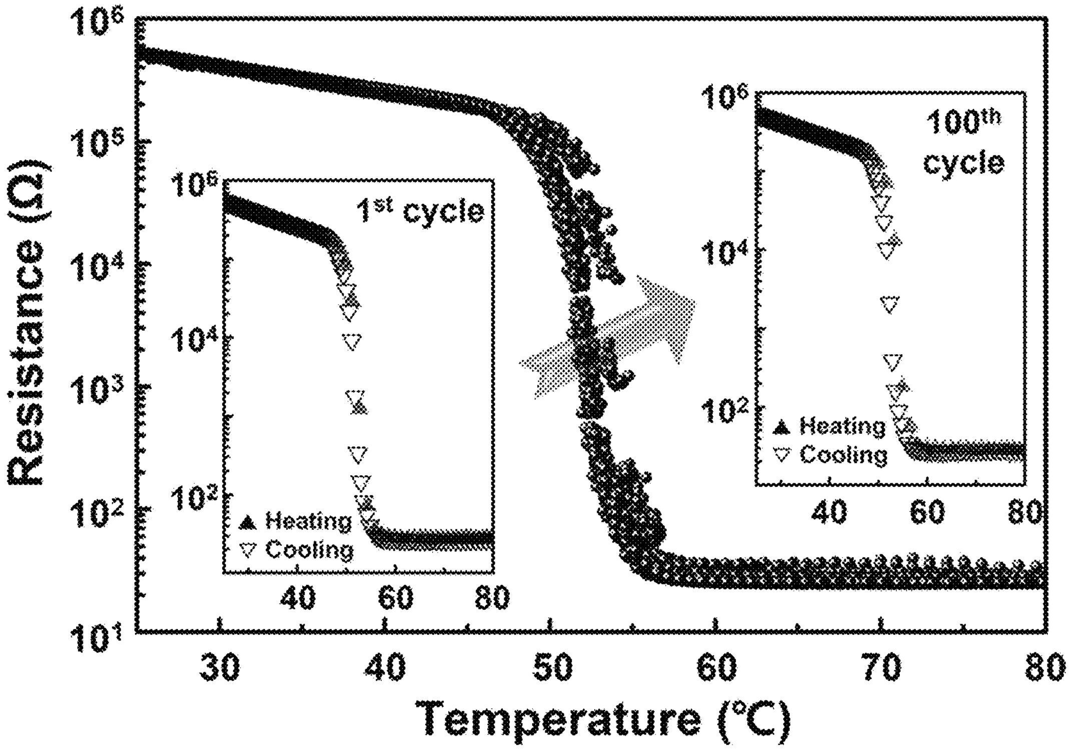
FIG. 9 is a graph representing resistance according to temperature during plural cycles in Experimental example 1.
Figure 10:
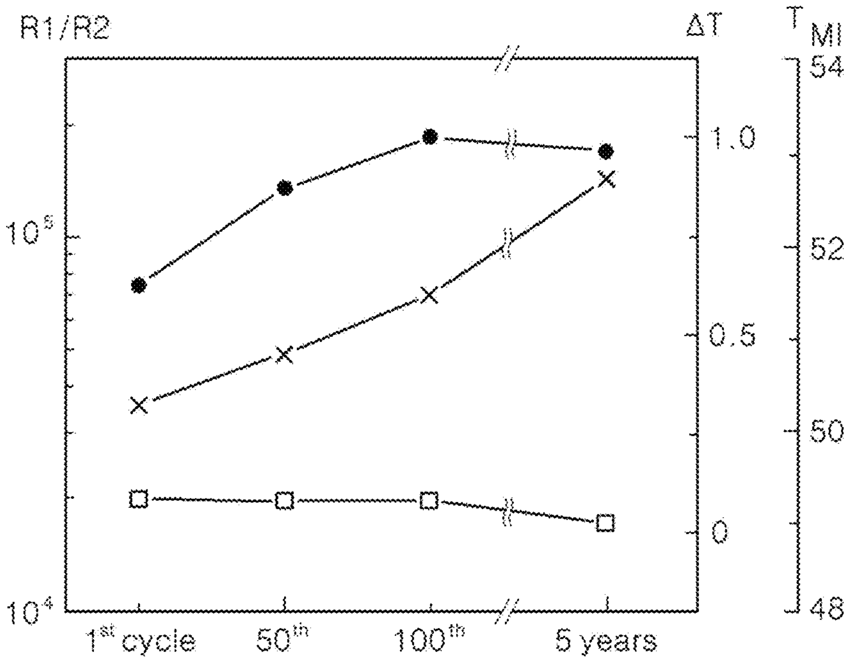
FIG. 10 is a graph representing changes of R1/R2 of Experimental example 1, hysteresis temperature difference ($\Delta T$) of Experimental example 1, and phase transition temperature ($T_{MI}$) of Experimental example 1 according to thermal cycle accumulation.

The resistance according to the temperature for the first cycle of the first and second thin films is illustrated in FIG. 8. In FIG. 8, the first thin film is indicated as "o", and the second thin film is indicated as "Δ". The resistance according to the temperature during multiple cycles of the first thin film is illustrated in FIG. 9. FIG. 10 is a graph in which X-axis represents the number of thermal cycles, and Y-axis represents R1/R2 of the first thin film, the hysteresis temperature difference (ΔT), and the phase transition temperature ($T_{MI}$). In FIG. 10, "□" represents R1/R2, "X" represents the hysteresis temperature difference (ΔT, unit is ° C.), and "•" represents the phase transition temperature ($T_{MI}$, unit is ° C.).

In Table 1, based on FIG. 8, in the first cycle, the resistance R1 at 25° C. of the first and second thin films, the resistance R2 at 80° C., the temperature $T_H$ at which the absolute value of the temperature coefficient of resistance (TCR) is maximum in the heating process, the temperature Tc at which the absolute value of the temperature coefficient of resistance (TCR) is maximum in the cooling process, R1/R2, the hysteresis temperature difference (ΔT), and the phase transition temperature ($T_{MI}$) are written.

TABLE 1

| | R1(Ω) | R2(Ω) | $T_H$ (° C.) | $T_C$ (° C.) | R1/R2 | ΔT (° C.) | $T_{MI}$ (° C.) |
|---|---|---|---|---|---|---|---|
| #1 | $5.257*10^5$ | $2.631*10^2$ | 52.427 | 52.370 | 19981 | 0.043 | 52.40 |
| #2 | $1.013*10^6$ | $4.653*10^2$ | 70.445 | 59.035 | 21778 | 11.41 | 64.74 |

Referring to Table 1, R1/R2 of the first and second thin films may be 19981 and 21778, which are more than equal to $10^4$. In consideration of the point that the ratio of the resistance of a typical temperature-sensitive resistive layer at 25° C. to the resistance thereof at 80° C. is several tens to several hundreds, the resistance change of the first and second thin films appears to be relatively larger than the resistance change of the typical temperature-sensitive resistive layer in the same temperature range. Accordingly, the electronic component using the first and second thin films may be capable of detecting the temperature more sensitively in comparison to the electronic component using the typical temperature-sensitive resistive layer.

Referring to Table 1, the second thin film has the hysteresis temperature difference (ΔT) of 11.41° C., which exceeds 1° C. The first thin film has the hysteresis temperature difference (ΔT) of 0.043° C., which is less than equal to 1° C. This means that the second thin film has a relatively large difference between the temperature in the heating process and the temperature in the cooling process with respect to the same resistance, whereas the first thin film has a relatively small difference therebetween. Accordingly, the electronic component using the first thin film may be capable of detecting the temperature more accurately in comparison to the electronic component using the second thin film.

Referring to Table 1 and FIG. 8, it can be known that the maximum value of the temperature coefficient of resistance (TCR) of the first thin film is larger than the maximum value of the temperature coefficient of resistance (TCR) of the second thin film, and this indicates that the first thin film has a larger resistance change according to the temperature change in comparison to the second thin film. Accordingly, the sensitivity to the temperature change near the phase transition temperature ($T_{MI}$) of the first thin film may be higher than the sensitivity to the temperature change near the phase transition temperature ($T_{MI}$) of the second thin film.

Referring to Table 1, the phase transition temperature ($T_{MI}$) of the first thin film is relatively lower than the phase transition temperature ($T_{MI}$) of the second thin film. This means that the first thin film is transitioned from insulator to conductor at a relatively low temperature compared to the second thin film (metal-insulator transition). Accordingly, the electronic component using the first thin film may be used as a switching component at a relatively low temperature in comparison to the electronic component using the second thin film.

In Table 2, based on FIGS. 9 and 10, in each cycle of the first thin film, R1/R2, the hysteresis temperature difference (ΔT), the phase transition temperature ($T_{MI}$), the change ($V_{\Delta T}$) of the hysteresis temperature difference (ΔT) for 10 cycles, and the change rate ($V_{R1/R2}$) of R1/R2 for 10 cycles are written.

Meanwhile, in Table 2, for example, based on the interval from the first cycle to the tenth cycle, the change (VΔT) of the hysteresis temperature difference (ΔT10) for 10 cycles means a difference between the hysteresis temperature difference (ΔT) of the first cycle that is the first cycle of the corresponding interval and the hysteresis temperature difference (ΔT) of the tenth cycle that is the last cycle of the corresponding interval ($V_{\Delta T}=|\Delta T1-\Delta T10|$). This is applied in the same manner even to the change ($V_{TMI}$) of the phase transition temperature ($T_{MI}$) for 10 cycles. In addition, in Table 2, for example, based on the interval from the first cycle to the tenth cycle, the change rate ($V_{R1/R2}$) of R1/R2 for 10 cycles means a percentage of a difference between the R1/R2 value ($(R1/R2)_1$) of the first cycle that is the first cycle of the corresponding interval and the R1/R2 value ($(R1/R2)_{10}$) of the tenth cycle that is the last cycle of the corresponding interval with respect to the R1/R2 value ($(R1/R2)_1$) of the first cycle that is the first cycle of the corresponding interval ($V_{R1/R2}=100*(|(R1/R2)_1-(R1/R2)_{10}|)/(R1/R2)_1$).

Further, in the following description of Table 2, explanation will be made in a state where the intervals are divided into a first interval from the first cycle to the 10th cycle, a second interval from the 11th cycle to the 20th interval, a third interval from the 21st cycle to the 30th cycle, a fourth interval from the 31st cycle to the 40th cycle, and a fifth interval from the 41st cycle to the 50th cycle.

TABLE 2

| | R1/R2 | ΔT (° C.) | $T_{MI}$ (° C.) | $V_{\Delta T}$ (° C.) | $V_{TMI}$ (° C.) | $V_{R1/R2}$ (%) |
|---|---|---|---|---|---|---|
| $1^{st}$ | 19981 | 0.043 | 52.40 | — | — | — |
| $10^{th}$ | 19849 | 0.347 | 52.54 | 0.304 | 0.14 | 0.66 |
| $11^{th}$ | 19754 | 0.349 | 52.50 | — | — | — |
| $20^{th}$ | 19811 | 0.100 | 52.70 | 0.249 | 0.249 | 0.29 |
| $21^{th}$ | 19798 | 0.162 | 52.32 | — | — | — |
| $30^{th}$ | 19706 | 0.492 | 52.75 | 0.330 | 0.43 | 0.46 |
| $31^{th}$ | 19620 | 0.569 | 52.15 | — | — | — |
| $40^{th}$ | 19785 | 0.372 | 52.71 | 0.197 | 0.56 | 0.84 |
| $41^{th}$ | 19906 | 0.220 | 52.53 | — | — | — |
| $50^{th}$ | 19650 | 0.456 | 53.13 | 0.236 | 0.60 | 1.28 |
| $100^{th}$ | 19714 | 0.636 | 53.46 | — | — | — |

Referring to Table 2, the change ($V_{\Delta T}$) of the hysteresis temperature difference (ΔT) for 10 cycles of the first thin film is 0.304° C. in case of the first interval, 0.249° C. in case of the second interval, 0.330° C. in case of the third interval, 0.197° C. in case of the fourth interval, and 0.236° C. in case of the fifth interval. That is, it can be seen that the first thin film has a substantially constant hysteresis temperature difference (ΔT) regardless of the intervals because the change ($V_{\Delta T}$) of the hysteresis temperature difference (ΔT) for 10 cycles is less than equal to 1° C. at all of the first to fifth intervals. As a result, the first thin film may be capable of detecting the accurate energy change repeatedly and stably within the temperature range in the heating and cooling processes.

Referring to Table 2, the change ($V_{TMI}$) of the phase transition temperature (TMI) for 10 cycles of the first thin film is 0.14° C. in case of the first interval, 0.249° C. in case of the second interval, 0.43° C. in case of the third interval, 0.56° C. in case of the fourth interval, and 0.60° C. in case of the fifth interval. That is, it can be seen that the first thin film has a substantially constant phase transition temperature ($T_{MI}$) regardless of the intervals because the change ($V_{TMI}$) of the phase transition temperature ($T_{MI}$) for 10 cycles is less than equal to 1.5° C. at all of the first to fifth intervals. As a result, the first thin film may be capable of exhibiting a switching function at substantially the same temperature repeatedly and stably within the temperature range in the heating and cooling processes.

Referring to Table 2, the change rate ($V_{R1/R2}$) of R1/R2 for 10 cycles of the first thin film is 0.66% in case of the first interval, 0.29% in case of the second interval, 0.46% in case of the third interval, 0.84% in case of the fourth interval, and 1.28% in case of the fifth interval. That is, it can be seen that the first thin film has a substantially constant R1/R2 value regardless of the intervals because the change rate ($V_{R1/R2}$) of R1/R2 for 10 cycles is less than equal to 5% at all of the first to fifth intervals. As a result, the first thin film may be capable of detecting a sensitive energy change repeatedly and stably within the temperature range of the heating and cooling processes.

Meanwhile, in the above, based on the first to fifth intervals, that is, based on the first to 50th cycles, the change rate ($V_{R1/R2}$) of R1/R2 for 10 cycles of the first thin film, the change ($V_{\Delta T}$) of the hysteresis temperature difference (ΔT)

for 10 cycles of the first thin film, and the change ($V_{TMI}$) of the phase transition temperature ($T_{MI}$) for 10 cycles of the first thin film have been explained, but this explanation is merely exemplary, and the scope of the present disclosure is not limited by the contents described above. That is, referring to FIG. 10, it can be known that, even in any 10 cycles which do not correspond to each of the first to fifth intervals (e.g., 10 cycles from the third cycle to the 12th cycle) within the first to 50th cycles, the first thin film has the change rate ($V_{R1/R2}$) of R1/R2 for 10 cycles, the change ($V_{\Delta T}$) of the hysteresis temperature difference (ΔT) for 10 cycles, and the change ($V_{TMI}$) of the phase transition temperature ($T_{MI}$) for 10 cycles. Further, referring to FIG. 10, it can be known that, even in cycles after the 50th cycle, the first thin film has the change rate ($V_{R1/R2}$) of R1/R2 for 10 cycles, the change ($V_{\Delta T}$) of the hysteresis temperature difference (ΔT) for 10 cycles, and the change ($V_{TMI}$) of the phase transition temperature ($T_{MI}$) for 10 cycles.

Figure 11:
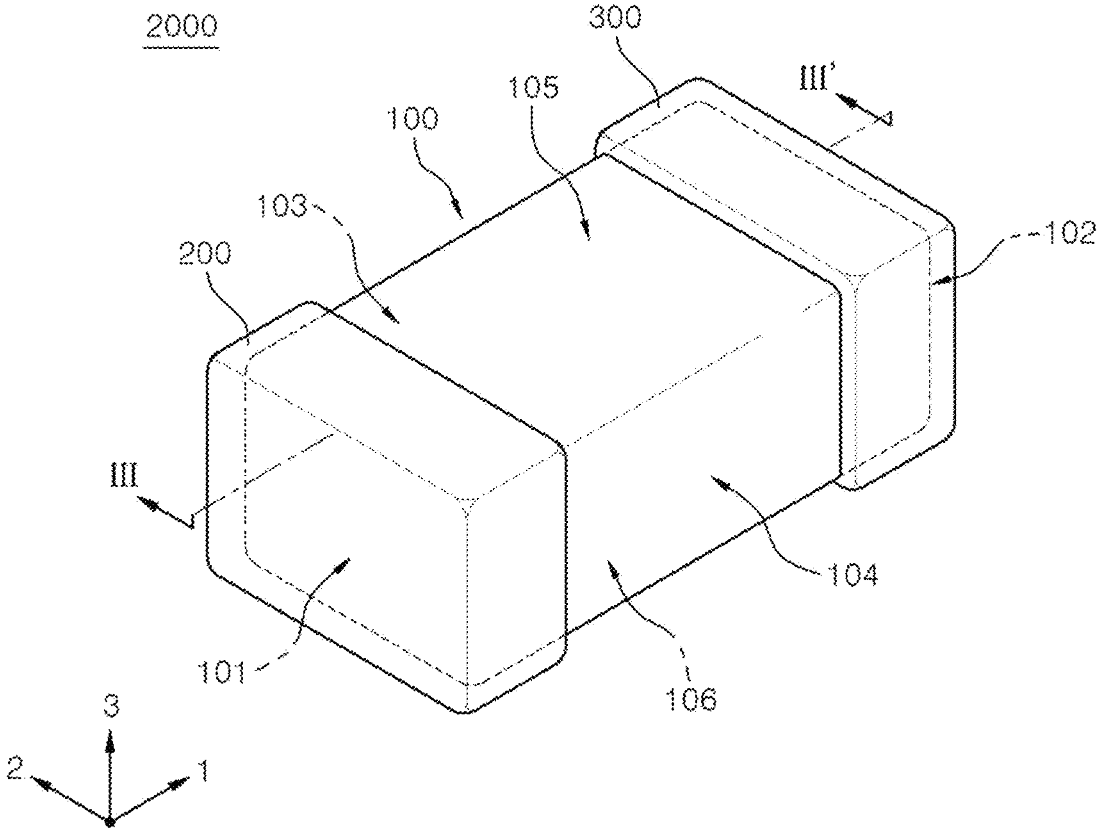
FIG. 11 is a view schematically representing a switching device according to another embodiment of the present disclosure.
Figure 12:
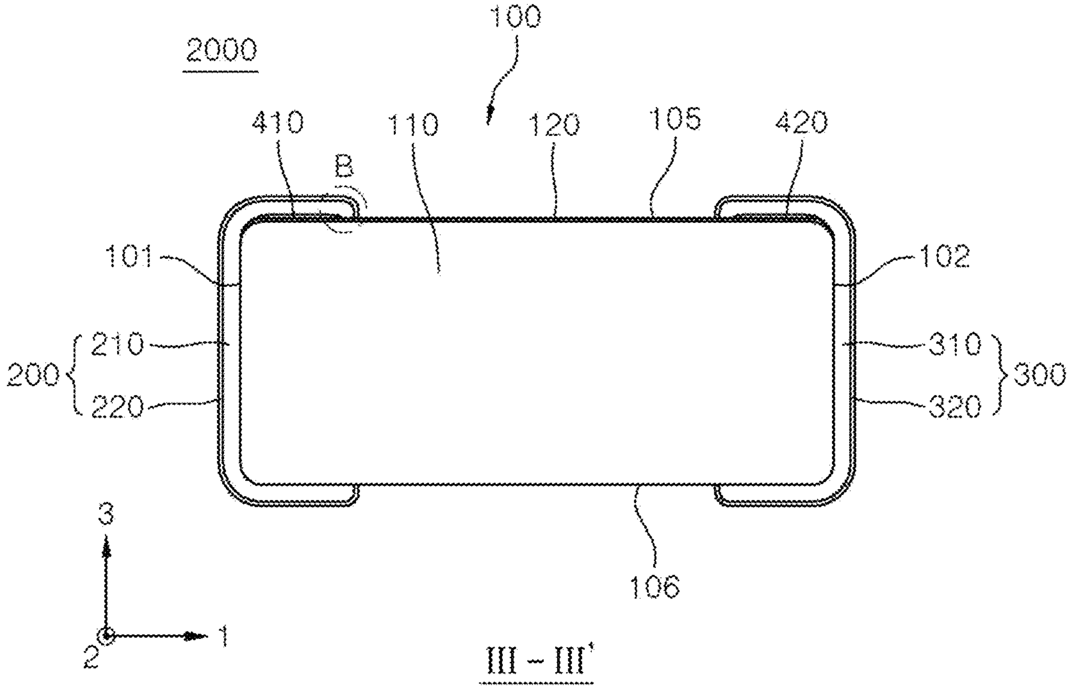
FIG. 12 is a view representing a cross section taken along line III-III' of FIG. 11.
Figure 13:
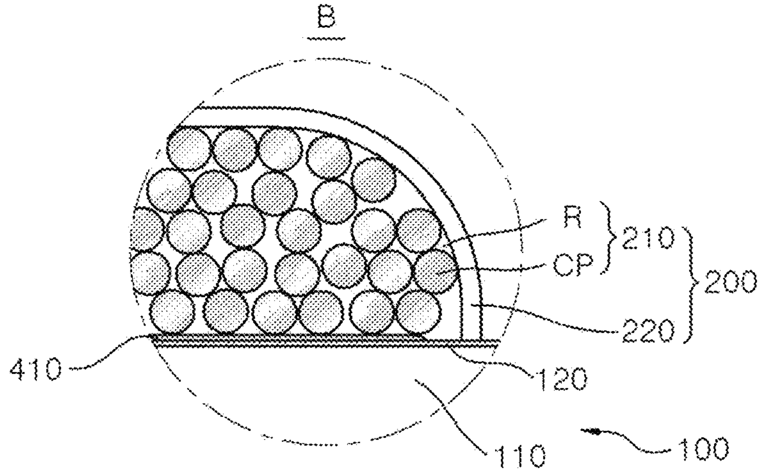
FIG. 13 is a view illustrating B of FIG. 1 in an enlarged manner.

FIG. 11 is a view schematically representing a switching device according to another embodiment of the present disclosure. FIG. 12 is a view representing a cross section taken along line III-III' of FIG. 11. FIG. 13 is a view illustrating B of FIG. 1 in an enlarged manner.

Referring to FIGS. 4 to 7 and 11 to 13, a switching device 2000 according to another embodiment of the present disclosure further includes lead thin films 410 and 420 as compared to the switching device 100 according to an embodiment of the present disclosure. Accordingly, in describing this embodiment, only the lead thin films 410 and 420 and their associated structures that are different from one embodiment of the present disclosure will be explained. The remaining configurations of this embodiment may be described as described in one embodiment of the present disclosure.

Referring to FIGS. 11 to 13, the lead thin films 410 and 420 are disposed between the external electrodes 200 and 300 and the functional thin film 120, and connects the external electrodes 200 and 300 and the functional thin film 120 to each other. The functional thin film 120 has one surface in contact with the base substrate 110 (top surface of the functional thin film 120 based on the direction of FIGS. 11 to 13) and the other surface facing the one surface (bottom surface of the functional thin film 120 based on the direction of FIGS. 11 to 13), wherein the lead thin films 410 and 420 are disposed on the top surface of the functional thin film 120.

The first lead thin film 410 is formed on the top surface of the functional thin film 120 in an area of the first surface 101 side of the body 100, and comes in contact with the functional thin film 120 and the first external electrode 200. The second lead thin film 420 is formed on the top surface of the functional thin film 120 in an area of the second surface 102 side of the body, and comes in contact with the functional thin film 120 and the second external electrode 300.

Each of the lead thin films 410 and 420 may include at least one of platinum (Pt), gold (Au), chrome (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co). Each of the lead thin films 410 and 420 may be in a single or double layer structure. As an example, the first lead thin film 410 may be formed in a single layer structure composed of one of platinum (Pt), gold (Au), chrome (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co). As another example, the first lead thin film 410 may be formed in a double layer structure including the first thin film in contact with the functional thin film 120 and the second thin film disposed on the first thin film. The first thin film and the second thin film may include different metals among the above metals.

The lead thin films 410 and 420 may be formed by a thin film process, such as physical vapor deposition (PECVD) such as sputtering, pulse laser deposition (PLD), and e-beam evaporation, chemical vapor deposition (PECVD or MOCVD), atomic layer deposition (ALD), and molecular beam epitaxy (MBE). For example, the lead thin films 410 and 420 may be formed on the functional thin film 120 by sputtering using a mask with one area open.

The thickness of the lead thin films 410 and 420 may be, for example, from 10 nm to 1000 nm. For example, the thickness of the lead thin films 410 and 420 may be measured by at least one of a mechanical method using a probe, a microscopic method using SEM, and an optical method using reflected light from the thin film.

Since the functional thin film 120 contains $VO_2$, which is a metal oxide as its main component, the coherence between the functional thin film 120 and the external electrodes 200 and 300 may be weak in the case where the external electrodes 200 and 300 that are conductors are formed directly on the functional thin film 120. Accordingly, in the present embodiment, by forming the lead thin films 410 and 420, which are metal thin film layers, between the functional thin film 120 and the external electrodes 200 and 300, the electrical and mechanical coherence between the functional thin film 120 and the external electrodes 200 and 300 can be improved.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A heating system comprising:

a heating element configured to generate heat;

a thermoelectric device disposed adjacent to the heating element; and a switching device electrically connected to the thermoelectric device and configured to maintain a temperature of the heating element within a set temperature range by switching a current that is supplied to the thermoelectric device based on the temperature of the heating element; and a thermal buffer disposed between the heating element and the switching device, wherein the switching device has a metal-insulator transition (MIT), wherein the switching device has a phase transition temperature lower than the set temperature, and wherein the thermal buffer is configured to allow the phase transition to occur at a temperature that is lower than the set temperature by buffering heat during its transfer from the heating element to the switching device.

2. The heating system of claim 1, wherein the switching device is configured to switch the current by a metal-insulator transition of a functional thin film including vanadium dioxide ($VO_2$).

3. The heating system of claim 1, further comprising:

a thermal buffer disposed between the heating element and the switching device, wherein the thermal buffer is configured to allow the heating element to be maintained within a range of the set temperature that is higher than the phase transition temperature by buffering heat during its transfer from the heating element to the switching device.

4. The heating system of claim 3, wherein:

the heating element and the thermoelectric device are connected in parallel, and the switching device is connected to the heating element in parallel and is connected to the thermoelectric device in series.

5. The heating system of claim 4, further comprising:

a power supply part that supplies a current to the heating element and the thermoelectric device, wherein the current of the power supply part is applied to the heating element at a temperature that is equal to or lower than a phase transition temperature $T_{MI}$ at which the metal-insulator transition of the switching device occurs, and wherein the current of the power supply part is applied to the thermoelectric device to cool the heating element in a temperature range that exceeds the phase transition temperature $T_{MI}$.

6. The heating system of claim 5, further comprising:

a resistor disposed between the power supply part and the heating element and connected in series to the power supply part.

7. The heating system of claim 6, wherein a resistance value of the resistor is between a resistance value of the switching device at the temperature that is equal to or lower than the phase transition temperature $T_{MI}$ and a resistance value of the switching device in the temperature range that exceeds the phase transition temperature $T_{MI}$.

8. A heating system comprising:

a heating element configured to generate heat;

a thermoelectric device disposed adjacent to the heating element; and a switching device electrically connected to the thermoelectric device and configured to maintain a temperature of the heating element within a set temperature range by switching a current that is supplied to the thermoelectric device based on the temperature of the heating element, wherein the switching device has a metal-insulator transition (MIT), and wherein the switching device includes:

an $Al_2O_3$ single crystal base substrate;

a $VO_2$ functional thin film disposed on the base substrate and doped with Ti; and first and second external electrodes disposed to be spaced apart from each other on the base substrate and/or the functional thin film and connected to the functional thin film.

9. An electronic device comprising:

a heating system configured to generate heat by being supplied with a power;

a body part configured to provide a space in which the heating system is installed; and a power supply part coupled to a part of the body part and configured to supply the power to the heating system, wherein the heating system includes:

a heating element configured to generate the heat;

a thermoelectric device disposed adjacent to the heating element; and a switching device electrically connected to the thermoelectric device and configured to maintain a temperature of the heating element within a set temperature range by switching a current that is supplied to the thermoelectric device based on the temperature of the heating element, wherein the switching device has a metal-insulator transition (MIT), wherein a phase transition temperature of the switching device is lower than the set temperature, wherein the electronic device further comprises a thermal buffer disposed between the heating element and the switching device, and wherein the thermal buffer is configured to enable the heating element to be maintained within a range of the set temperature that is higher than the phase transition temperature by buffering heat during its transfer from the heating element to the switching device.

10. The electronic device of claim 9, further comprising:

a thermal buffer disposed between the heating element and the switching device, wherein the thermal buffer is configured to enable the phase transition to occur at a temperature that is lower than the set temperature by buffering heat during its transfer from the heating element to the switching device.

11. The electronic device of claim 9, wherein:

the heating element and the thermoelectric device are connected in parallel, and the switching device is connected to the heating element in parallel and is connected to the thermoelectric device in series.

12. The electronic device of claim 11, wherein:

the current of the power supply part is applied to the heating element at a temperature that is equal to or lower than a phase transition temperature $T_{MI}$ at which the metal-insulator transition of the switching device occurs, and the current of the power supply part is applied to the thermoelectric device to cool the heating element in a temperature range that exceeds the phase transition temperature $T_{MI}$.

13. The electronic device of claim 12, further comprising:

a resistor disposed between the power supply part and the heating element and connected in series to the power supply part, wherein a resistance value of the resistor is between a resistance value of the switching device at the temperature that is equal to or lower than the phase transition temperature $T_{MI}$ and a resistance value of the switching device in the temperature range that exceeds the phase transition temperature $T_{MI}$.

* * * * *